(12) United States Patent
Duffy

(10) Patent No.: US 8,562,224 B2
(45) Date of Patent: Oct. 22, 2013

(54) BEARING OILING SYSTEM

(75) Inventor: Kevin Duffy, Somers, CT (US)

(73) Assignee: United Technologies Corporation, Hartford, CT (US)

( * ) Notice: Subject to any disclaimer, the term of this patent is extended or adjusted under 35 U.S.C. 154(b) by 106 days.

(21) Appl. No.: 13/246,156

(22) Filed: Sep. 27, 2011

(65) Prior Publication Data

US 2013/0077907 A1    Mar. 28, 2013

(51) Int. Cl.
    *F16C 33/66*    (2006.01)
(52) U.S. Cl.
    USPC .......................................... 384/475
(58) Field of Classification Search
    USPC ................................ 384/473–475
    See application file for complete search history.

(56) References Cited

U.S. PATENT DOCUMENTS

| | | |
|---|---|---|
| 3,811,743 A | 5/1974 | Wren |
| 4,194,797 A | 3/1980 | Hormann et al. |
| 4,334,720 A | 6/1982 | Signer |
| 4,463,994 A | 8/1984 | Eliason et al. |
| 4,797,014 A | 1/1989 | Nicolich |
| 4,974,972 A | 12/1990 | Boosler, Jr. et al. |
| 5,749,660 A | 5/1998 | Dusserre-Telmon et al. |
| 6,328,478 B1 | 12/2001 | Fukuda et al. |
| 6,443,623 B2 | 9/2002 | Sugita et al. |
| 6,511,228 B2 | 1/2003 | Dusza |
| 6,682,222 B2 | 1/2004 | Fisher |
| 7,178,987 B2 | 2/2007 | Bridges et al. |
| 7,931,407 B2 | 4/2011 | Begin et al. |

FOREIGN PATENT DOCUMENTS

JP    1307515 A    12/1989

*Primary Examiner* — Thomas R Hannon
(74) *Attorney, Agent, or Firm* — Kinney & Lange, P.A.

(57) ABSTRACT

A split inner ring of a bearing assembly comprises first and second rings, a plurality of holes, a circumferential annulus and a lubrication system. The first and second rings are configured to mate axially at inside side surfaces to define an inner raceway formed on an outer surface of the rings. The plurality of holes are circumferentially spaced and extend from an outside side surface to an inside side surface of the first ring. The circumferential annulus is formed on the inside side surface of the first ring, between the inner raceway and an inner surface of the first ring, and intersects the plurality of holes. The lubrication system connects the circumferential annulus to the outer surface of the first ring and the second ring. The lubrication system comprises circumferentially spaced slots in the first ring, or axial holes fluidly coupled with radial holes in the second ring.

23 Claims, 7 Drawing Sheets

BEARING OILING SYSTEM

BACKGROUND

The present invention relates to lubrication of bearing assemblies, and in particular, to lubrication of an inner ring of angular contact ball bearings assemblies, such as those used in gas turbine engines.

Bearing assemblies are integral to the performance and speed of gas turbine engines. To keep bearing assemblies lubricated and cool, it is essential that lubricating fluid, such as oil, be delivered to the bearing assemblies. Ball bearing assemblies comprise an array of spherical ball bearing elements that roll between inner and outer rings. In gas turbine engines, an engine shaft is typically inserted into the inner ring, while the outer ring is secured to a stationary strut. Thus, the inner ring rotates with the shaft as the ball bearing elements roll along the inner and outer rings.

Conventional under-race oil delivery systems provide oil to the bearings by delivering the oil to the inner diameter surface of the inner raceway from under the inner ring. Typically, a hole connects the inner diameter surface of the inner ring the outer diameter surface of said ring, allowing lubricating oil to pass through the ring. In this manner, lubricating oil can be passed to either the raceway of the inner ring or to the shoulder of the inner ring where the bearing cage contacts the inner ring. In some cases a spacer having axial slots is used to allow the oil to flow between the shaft and the inner diameter of the inner ring. Inclusion of this spacer, however, can have a negative impact on the performance of the bearing or its ability to fit into a limited space. Inclusion of the spacer requires that the bearing assembly be at a larger diameter than it would be without the spacer. As a consequence, the ball bearing elements are rotating at a larger pitch diameter. Larger pitch diameters lead to larger stresses from centrifugal forces and reduced thrust capacity in the bearing assembly, particularly for high speed applications. Inclusion of the spacer also requires that the outer diameter of the bearing be increased. In applications with limited radial space, removal of the spacer under the bearing might be beneficial. Thus, it is desirable to reduce the pitch diameters in bearing assemblies.

SUMMARY

The present invention is directed to a split inner ring of a bearing assembly. The split inner ring comprises first and second rings, a plurality of holes, a circumferential annulus and a lubrication system. The first and second rings are configured to mate axially at inside side surfaces to define an inner raceway formed on an outer surface of the rings. The plurality of holes are circumferentially spaced and extend from an outside side surface to an inside side surface of the first ring. The circumferential annulus is formed on the inside side surface of the first ring, between the inner raceway and an inner surface of the first ring, and intersects the plurality of holes. The lubrication system connects the circumferential annulus to the outer surface of the first ring and the second ring. In one embodiment of the invention, the lubrication system comprises a plurality of circumferentially spaced slots formed on the inside side surface of the first ring. In another embodiment of the invention, the lubrication system comprises a plurality of circumferentially spaced axial holes extending from the inside side surface of the second ring and a plurality of circumferentially spaced radial holes fluidly coupled to the plurality of circumferentially spaced axial holes and the outer surface at the second ring.

DETAILED DESCRIPTION

Figure 1:
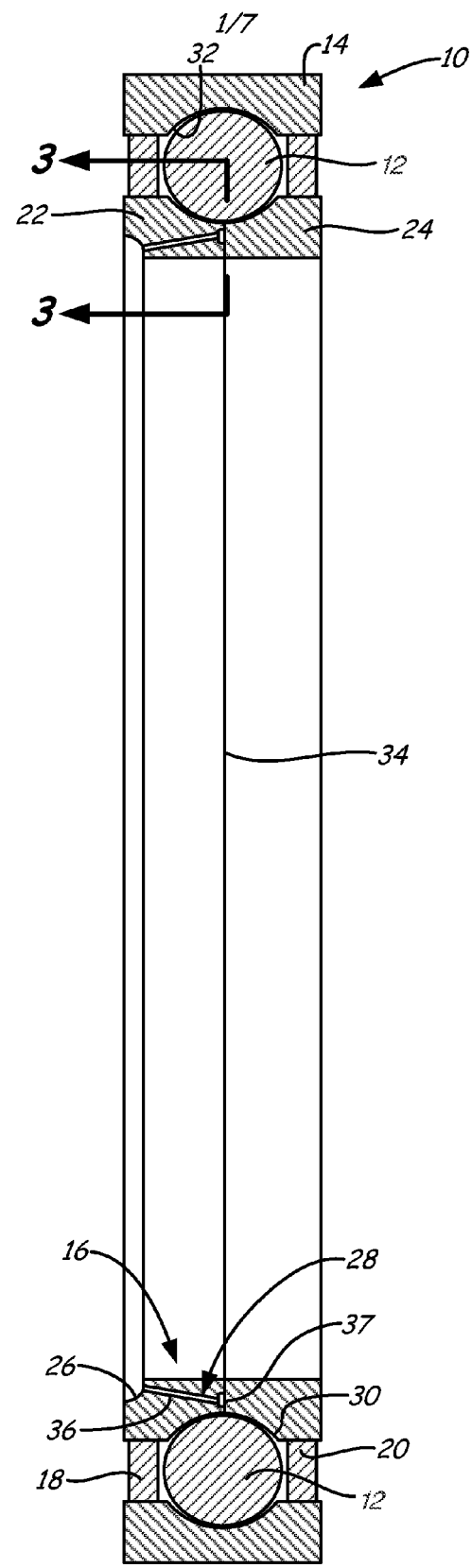
FIG. 1 is a side cross-sectional view of an angular contact roller bearing assembly showing ball bearing elements positioned between an outer ring and a split inner ring.

FIG. 1 is a side cross-sectional view of angular contact roller bearing assembly 10 showing ball bearing elements 12 positioned between outer ring 14, split inner ring 16, forward cage rail 18 and aft cage rail 20. Split inner ring 16 includes forward ring 22, aft ring 24, front collection annulus 26, lubrication system 28 and inner raceway 30. Outer ring 14 includes outer raceway 32. Forward ring 22 and aft ring 24 are joined at split line 34. Although the present invention is described with respect to ball bearings, other embodiments may be applied to roller bearings and tapered roller bearings.

Ball bearing elements 12 are an array of spherical ball bearings contained within assembly 10. Ball bearing elements 12 roll along inner raceway 30 and outer raceway 32 between split inner ring 14 and outer ring 16. Forward cage rail 18 and aft cage rail 20 are disposed on forward and aft sides of bearings 12 and prevent the ball bearings from dislodging from raceways 30 and 32, as is known in the art. In particular, forward cage rail 18 and aft cage rail 20 are connected by webbing (not shown) circumferentially between ball bearing elements 12. In gas turbine engine applications, split inner ring 16 is typically mounted to a rotating shaft, while outer ring 14 is mounted to a stationary support strut. As the shaft rotates, bearings 12 roll along raceways 30 and 32, pulling forward cage rail 18 and aft cage rail 20 along. Due to the heat generated by high speed rotation, ball bearing elements 12 need to be lubricated and cooled in order to maintain performance. Lubrication system 28 provides a means for delivering lubrication from an external source to ball bearing elements 12. In particular, lubrication system 28 connects a side face of bearing assembly 10 to inner raceway 30 so that lubricating fluid from adjacent assembly 10 can be delivered to bearings 12.

Lubricating fluid, such as oil, is delivered to the forward end of bearing assembly 10 using any conventional system. In gas turbine engine applications, lubricating fluid from an oil reservoir is pumped directly to the outside of the bearing as is known in the art. Thereafter, annulus 26 collects fluid delivered along the surface of the shaft in the vicinity of bearing assembly 10. In particular, centrifugal forces pool the fluid within annulus 26. From there, centrifugal forces push the fluid into lubrication system 28, where it is routed rearward and outward to inner raceway 30. In the depicted embodiment, lubrication system 28 permits the lubricating fluid to enter bearing assembly 10 from the front of forward ring 22. This reduces the overall height of bearing assembly 10 by eliminating the need to flow the fluid underneath inner ring 16. Moreover, entry of fluid into bearing assembly 10 at the front of forward ring 22 also eliminates the need for placing any additional structure between bearing assembly 10 and the shaft, further reducing the diameter of bearing assembly 10 when installed. Lubrication system 28 includes a series of holes 36 that connect to flow lubricating fluid to annulus 37. Radial slots 38 connect circumferential annulus 37 to inner raceway 30 to flow lubricating fluid, as is shown in FIG. 2.

Figure 2:
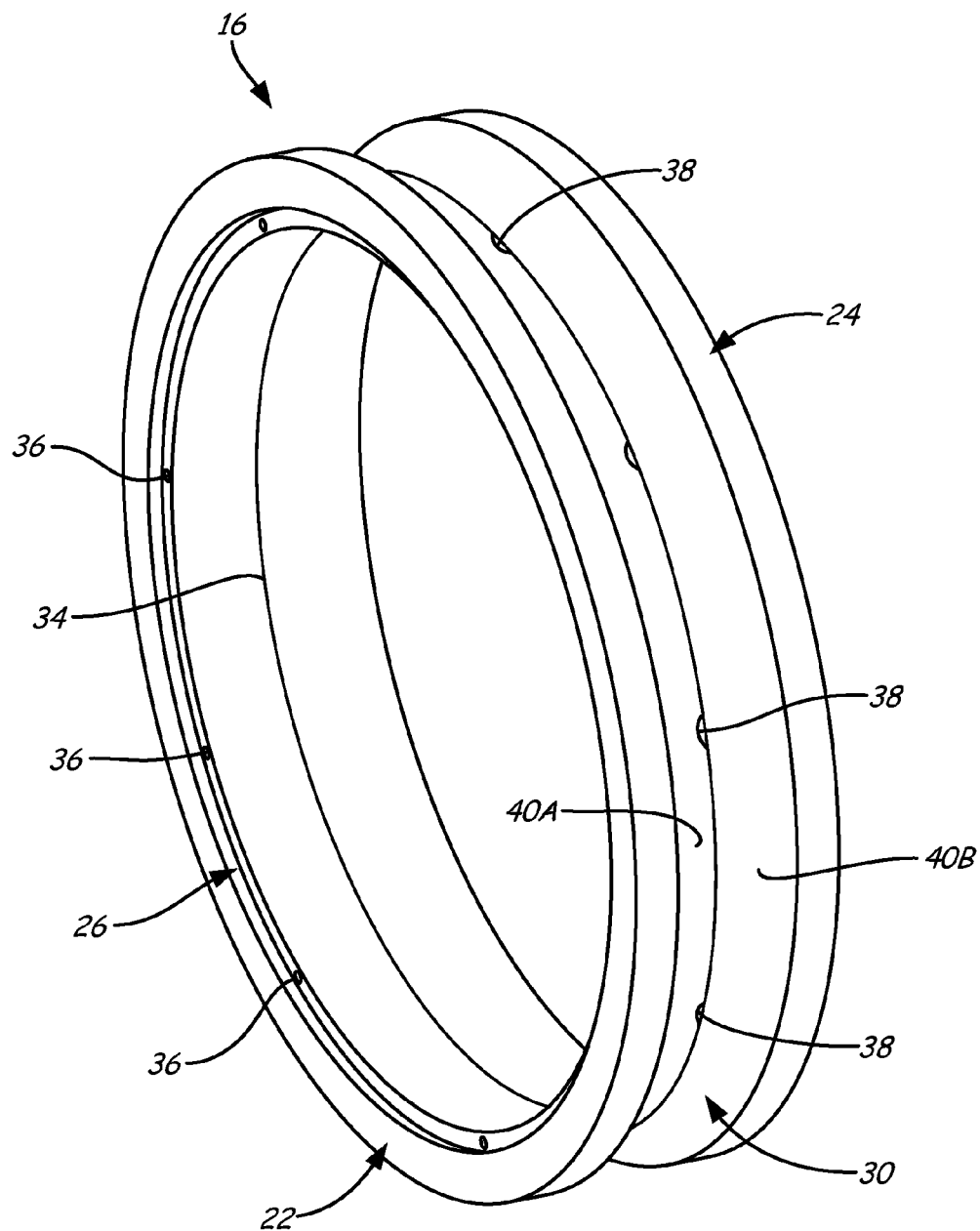
FIG. 2 is perspective view of the split inner ring of FIG. 1 showing a forward ring and an aft ring.

FIG. 2 is perspective view of split inner ring 16 of FIG. 1 showing forward ring 22 and aft ring 24. Forward ring 22 and aft ring 24 are joined at split faces along split line 34. In various embodiments, rings 22 and 24 are held in place by mechanical fasteners or by installation of bearing assembly 10. Lubrication system 28 of FIG. 1 is comprised of holes 36 and slots 38 extending through front ring 22. Holes 36 extend generally axially into collection annulus 26, while slots 38 extend generally radially along the split face of aft ring 24. Forward race 40A and aft race 40B join at split line 34 to form inner raceway 30. Ball bearing elements 12 are spherical in shape. Races 40A and 40B form a non-circular arcuate, or arched, path upon which bearings 12 (FIG. 1) roll. As is known in the art, races 40A and 40B comprise angled surfaces along which ball bearing elements 12 ride at contact points on either side of split line 34. As such, slots 38 are positioned below ball bearing elements 12 to permit lubricating fluid into inner raceway 30.

As mentioned, lubricating fluid is delivered to collection annulus 26 via any suitable means. In the embodiment of FIG. 2, annulus 26 comprises an axial counterbore in the front surface of forward ring 22. As such, an overhang is provided in the radial direction that collects lubricating fluid. From annulus 26, the fluid is routed into holes 36 that extend through to split line 34. Holes 36 extend to flow annulus 37 (FIG. 1) and connect to slots 38, which are better shown in FIG. 3.

Figure 3:
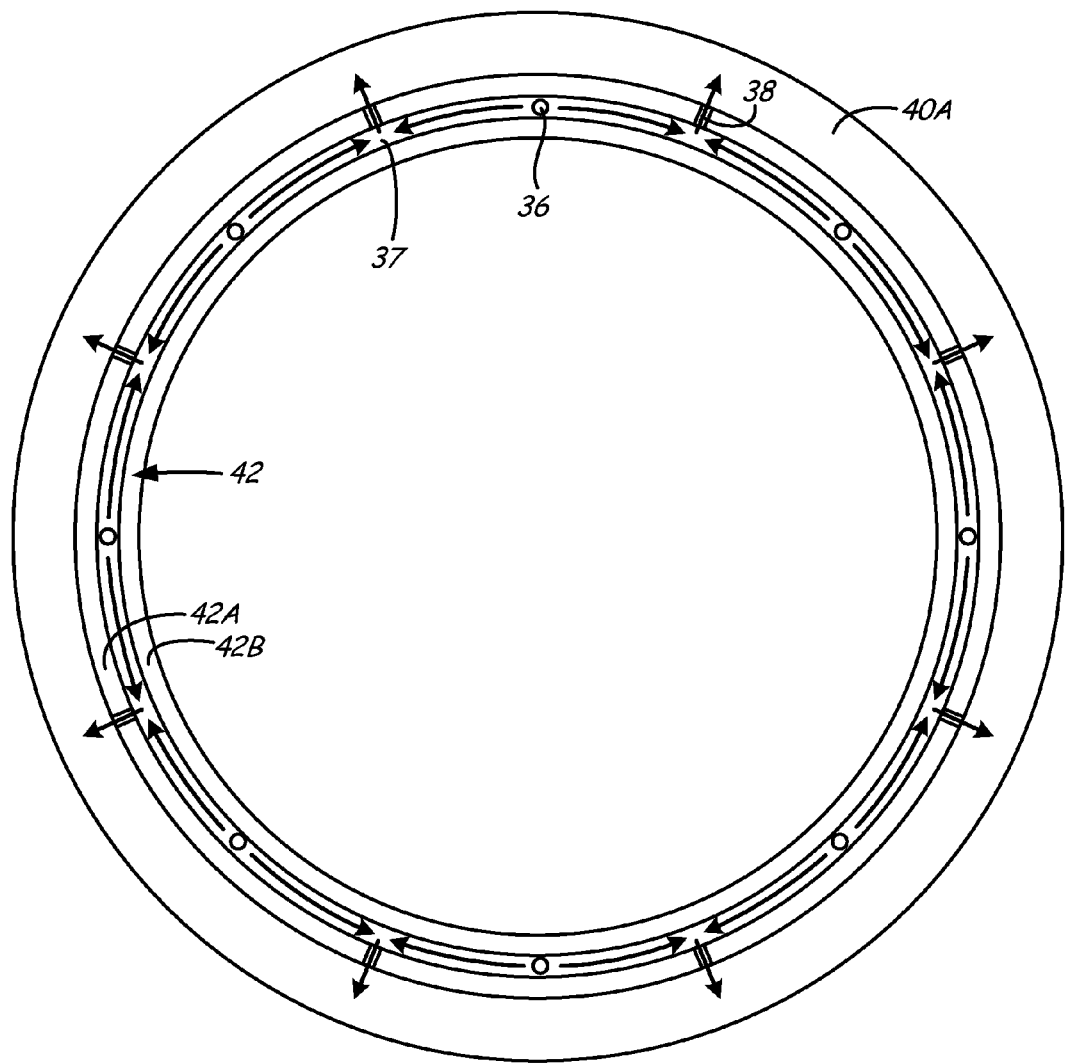
FIG. 3 is an aft view of the front ring of the split inner ring of FIG. 2 showing a split face.

FIG. 3 is a rear view of forward ring 22 of inner split ring 16 showing split face 42. The orientation of FIG. 3 is shown at section line 3-3 of FIG. 2, with ball bearing elements 12 and forward cage rail 18 removed. Flow annulus 37 extends axially forward into split face 42 to divide split face 42 into outer portion 42A and inner portion 42B. In one embodiment, annulus 37 divides split face 42 into equal portions or is centered on split face 42. The outer and inner portions of split face 42 abut a forward facing split face of aft ring 24 at split line 34 (See FIG. 2). Slots 38 extend radially from annulus 37 along outer portion 42A of split face 42. In the embodiment shown, slots 38 comprise semi-circular or arcuate cross-sections when viewed from a radial direction. Holes 36 extend forward into flow annulus 37 to intersect collecting annulus 26 (FIG. 1). In the embodiment shown, holes 36 comprise circular cross-sections when viewed from an axial direction. Forward race 40A extends arcuately from outer portion 42A. Holes 36 are offset from slots 38 so as to be disposed midway between adjacent slots 38. In the embodiment shown, eight slots 38 are interposed evenly between eight holes 36. Offsetting of holes 36 and slots 38 prevents the formation of hoop stress concentrations within forward ring 22. Annulus 37 extends around the entire circumference of split face 42 of forward ring 22 and intersects all eight holes 36 and all eight slots 38.

The flow of lubricating fluid through lubrication system 28 is shown with arrows in FIG. 3. Lubricating fluid enters holes 36 via centrifugal force from collecting annulus 26. The lubricating fluid travels generally axially in the aft direction, or downstream, into flow annulus 37. Within flow annulus 37, the lubricating fluid disperses from holes 36 in clock-wise and counter-clock-wise directions to engage slots 38. At slots 38, the lubricating fluid travels radially outward to forward race 40A. Within forward race 40A, the lubricating fluid disperses into ball bearing elements 12 and is spread along inner raceway 30 and outer raceway 32 via movement of the bearings. The flow path defined by lubrication system 28 reduces the overall height of bearing assembly 10 when installed on a shaft, as shown in FIG. 4.

Figure 4:
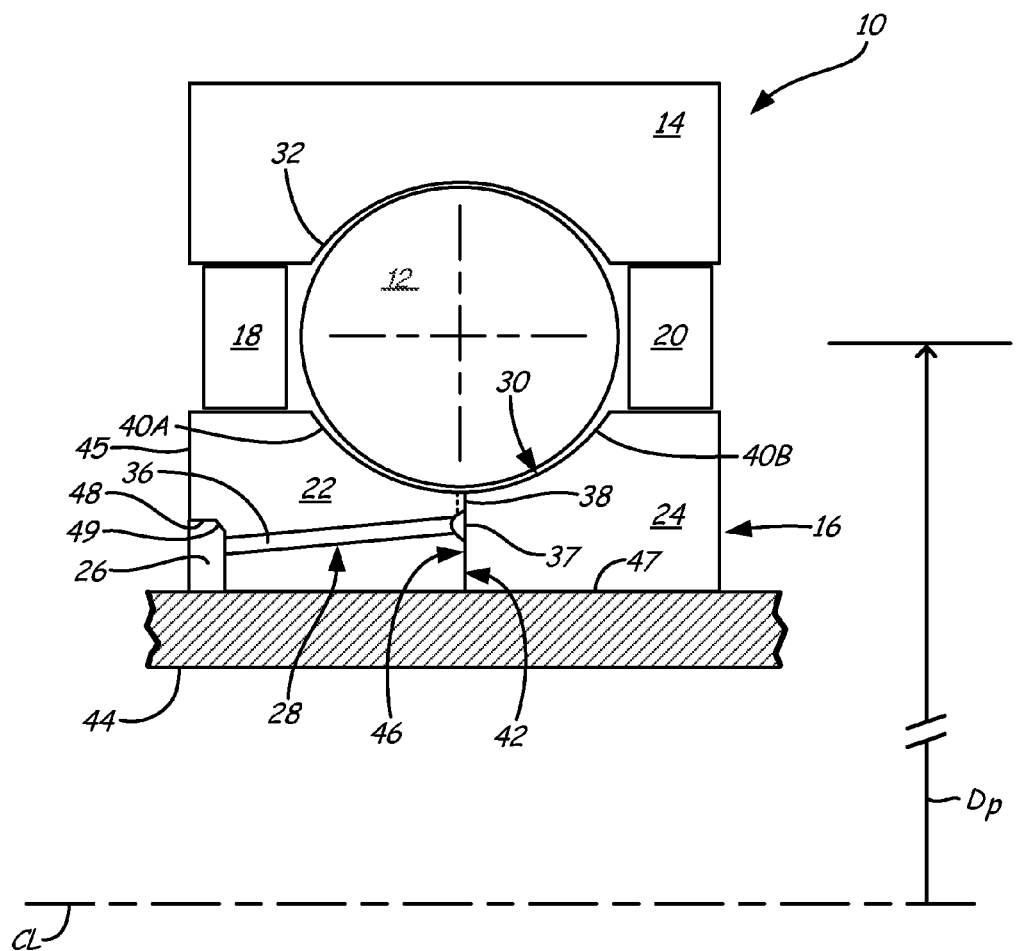
FIG. 4 is a partial side cross-sectional view of an angular contact roller bearing assembly disposed around a shaft and having an integral collecting annulus.

FIG. 4 is a partial side cross-sectional view of angular contact roller bearing assembly 10 disposed around shaft 44 and having integral collecting annulus 26. Bearing assembly 10 includes the same elements as shown in FIG. 1, with like reference numerals used throughout. Split face 42 of forward ring 22 is joined to split face 46 of aft ring 24 to form inner split ring 16. Forward ring 22 includes front face 45 and aft ring 24 includes split face 46. Rings 22 and 24 align to form inner raceway 30 at a radially outer surface, and inner surface 47 at a radially inner surface. Front face 45 comprises an outside side surface of forward ring 22. Split face 42 comprises an inside side surface of forward ring 22. A portion of inner surface 47 comprises an inside surface of forward ring 22. Forward race 40A comprises an outside surface of forward ring 22. Front face 45, split face 42, inner surface 47 and forward race 40A form annular surfaces centered around centerline CL.

Shaft 44 is inserted into inner surface 47 so as to be coaxial around centerline CL. The diameter of shaft 44 plus the distance between inner surface 47 and the center of ball bearing 12 defines pitch diameter D. In other words, pitch diameter $D_P$ is measured from the center of bearing assembly 10 at center line CL to the center of ball bearing 12. As such, for a shaft of a given diameter, the overall pitch diameter is the combination of the diameter of shaft 44, the diameter of bearing assembly 10 and the diameter of any spacer inserted in between. In the present invention, the need for spacers is eliminated such that pitch diameter $D_P$ is reduced for a given shaft size.

Lubricating system 28 of the present invention eliminates the need for a slotted insert by connecting front face 45 of forward ring 22 with inner raceway 30. In particular, holes 36 extend from front face 45 to split face 42. More specifically, collecting annulus 26 extends into front face 45 to form shoulder 48. Shoulder 48 forms a surface against which lubricating fluid pools when shaft 44 and inner ring 16 rotate. Shoulder 48 includes ramp 49, which funnels fluid toward holes 36. Flow annulus 37 extends into split face 42. Holes 36 extend from annulus 26 to annulus 37. In the embodiment shown, holes 36 angle radially outward as they extend from annulus 26 to annulus 37 to assist flow of lubricating fluid. In one embodiment, holes 36 are angled approximately ten degrees with respect to centerline CL. In other embodiments, holes 36 can be parallel to centerline CL or flat. Holes 36 can be oriented at any angle so that they break through split face 42 (with flow annulus 37 being appropriately positioned in between) and not forward race 40A. As discussed above, flow annulus 37 comprises a complete circle to allow lubricating fluid to disperse. Slots 38 connect flow annulus 37 to inner raceway 30. Slots 38 extend into split face 42 such that split face 46 does not require any machining. Slots 38 break through inner raceway 30 at split line 34, which is located between the point contacts that ball bearing elements 12 make with inner raceway 30, thereby avoiding spallation of the ball bearing elements.

Collecting annulus 26, holes 36, flow annulus 37 and slots 38 can be machined or drilled into forward ring 22 using any conventional process. Flow annulus 37 provides a stress-interruption surface for the exit of holes 36 into split face 42. In particular, annulus 37 has a larger diameter, or is taller, than holes 36. Similarly, annulus 37 is larger than slots 38. Increased size of annulus 37 permits holes 36 and slots 38 to be drilled or machined into inner ring 22 without breaking through to split face 42. This helps ensure that split face 42 will mate flush with split face 46. This also eliminates the need for holes 36 and slots 38 to terminate at precise locations. As such, lubrication system 28 can be easily and inexpensively formed into forward ring 22. The construction of forward ring 22 can be further simplified by providing collecting annulus 26 on a separate component.

Figure 5:
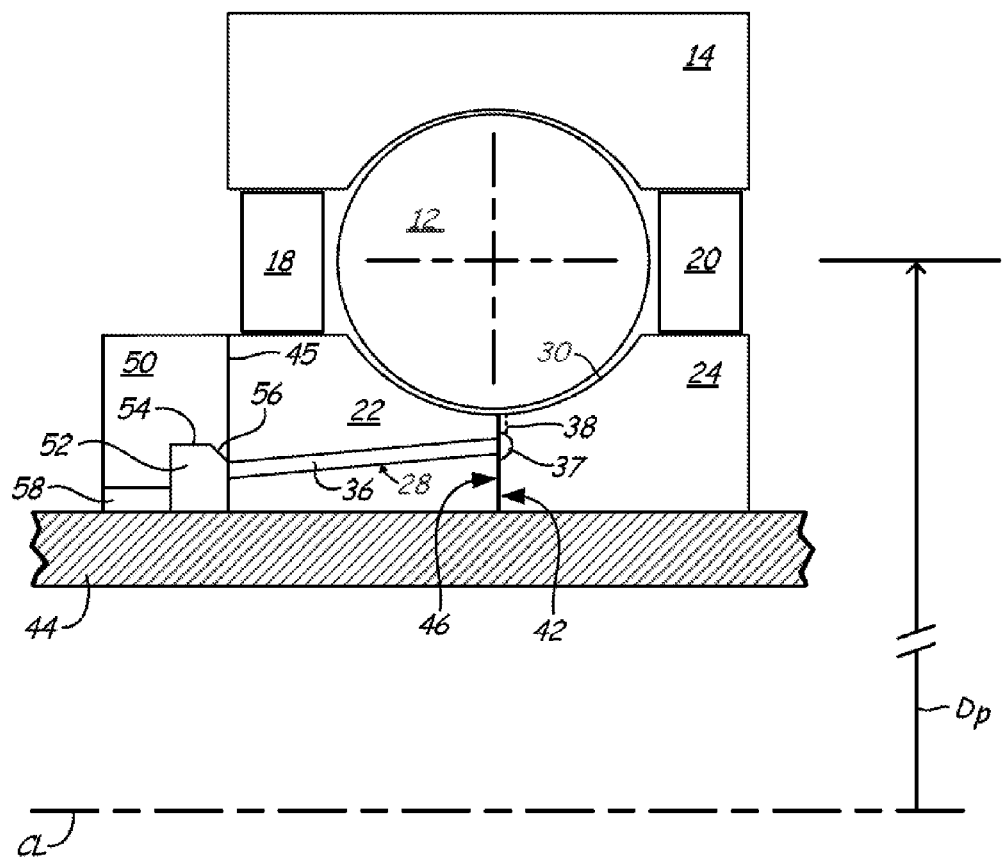
FIG. 5 is a partial side cross-sectional view of an alternative embodiment of the angular contact roller bearing assembly of FIG. 4 having a separate collecting annulus ring.

FIG. 5 is a partial side cross-sectional view of an alternative embodiment of angular contact roller bearing assembly 10 of FIG. 4 having separate collecting annulus ring 50. Bearing assembly 10 includes the same elements as shown in FIG. 4, with like reference numerals used throughout. In FIG. 5, however, radial slots 38 and circumferential flow annulus 37 are formed on split face 46 of aft ring 24, and forward ring 22 does not include collecting annulus 26. Instead front face 45 extends all the way between shaft 44 and forward cage ring 18. Holes 36 thus extend all the way out to front face 45. Front face 45 is flat to engage annulus ring 50. Ring 50 comprises a ring-shaped body having a rectangular cross-section. Ring 50 includes collecting annulus 52, shoulder 54, ramp 56 and slots 58. Collecting annulus 52 serves the same function as collecting annulus 26 of FIG. 4. However, annulus 54 is provided on ring 50 to simplify the construction of forward ring 22.

Slots 58 extend through the radially inner surface of ring 50 adjacent shaft 44 to permit lubricating fluid to enter annulus 52. Slots 58 are intermittently dispersed about ring 50 to permit engagement with shaft 44 and to allow fluid to flow beneath ring 50. When shaft 44 rotates, lubricating fluid pools on shoulder 54. Ramp 56 extends from should 54 to the entrance of holes 36 to assist flow of lubricating fluid from shoulder 54 to holes 36. From holes 36, lubricating fluid flow out to inner raceway 30 via the remainder of lubrication system 28, as described with reference to FIG. 4.

Figure 6:
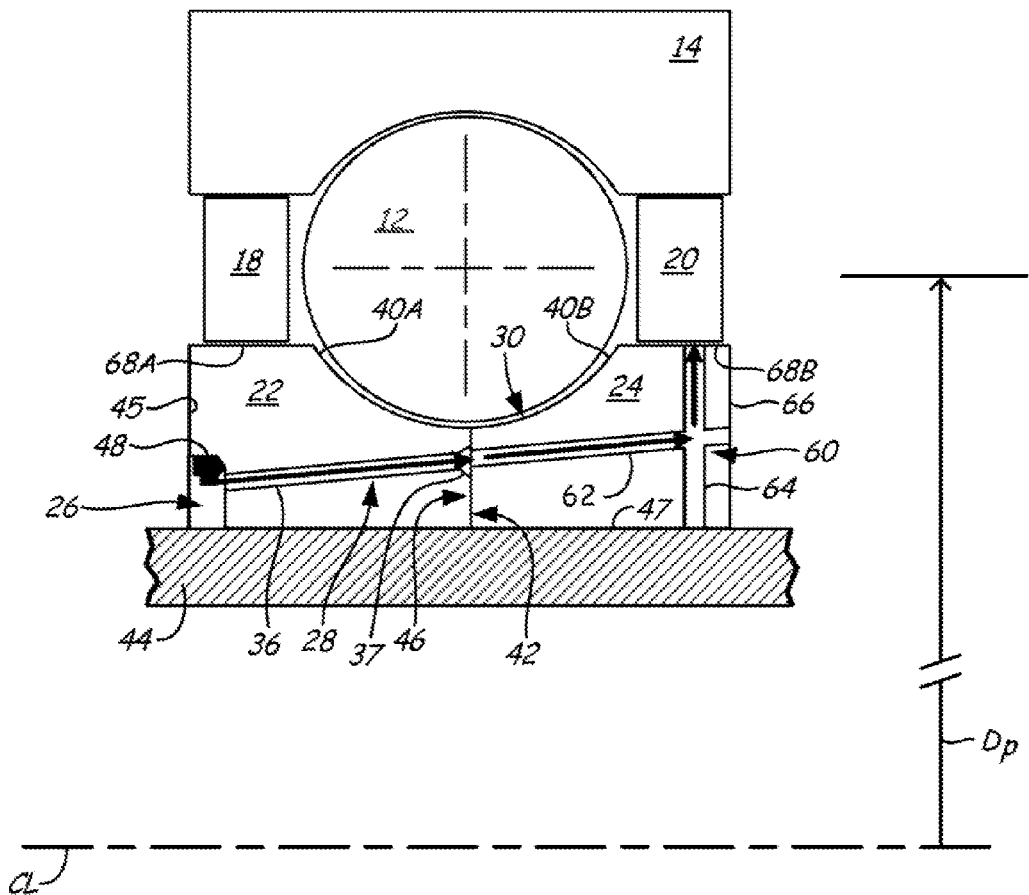
FIG. 6 is a partial side cross-sectional view of the angular contact roller bearing assembly of FIG. 4 having an intersecting-hole cage lubrication system.

FIG. 6 is a partial side cross-sectional view of angular contact roller bearing assembly 10 of FIG. 4 in which lubrication system 28 includes intersecting-hole cage lubrication system 60. Bearing assembly 10 includes the same elements as shown in FIG. 4, with like reference numerals used throughout. In FIG. 6, however, forward ring 22 does not include slots 38 and instead split face 46 of aft ring 24 includes axial hole 62 and radial hole 64, which form intersecting-hole cage lubrication system 60. Aft ring 24 includes split face 46, aft race 40B, a portion of inner surface 47 and rear face 66. Forward ring 22 includes forward cage lands face 68A, and aft ring 24 includes aft cage lands face 68B. Cage lands faces 68A and 68B and races 40A and 40B form an outer surface of inner split ring 16. Rear face 66 comprises an outside side surface of aft ring 24. Split face 46 comprises an inside side surface of aft ring 24. A portion of inner surface 47 comprises an inside surface of aft ring 24. Aft race 40B comprises an outside surface of aft ring 24. Rear face 66, split face 46, inner surface 47 and aft race 40B form annular surfaces centered around centerline CL.

Axial hole 62 comprises one of a plurality of holes arranged in an annular array about the entirety of aft ring 24. Likewise, radial hole 64 comprises one of a plurality of holes arranged in an annular array about the entirety of aft ring 24. Holes 62 and holes 64 of lubrication system 60 can be easily formed using any conventional drilling process.

Axial holes 62 are fluidly linked by flow annulus 37 to holes 36. As shown, holes 62 are axially aligned with holes 36, but can be circumferentially offset from holes 36. Axial holes 62 extend from split face 46 through to rear face 66. As shown, axial holes 62 are angled with respect to inner surface 47. Holes 62 are angled so as to extend from annulus 37 to intersect holes 64. However, holes 62 can be oriented parallel to inner surface 47 in other embodiments. In yet other embodiments, holes 64 can be omitted and holes 62 can be angled to extend from annulus 37 straight to cage face 68B. However, aft ring 24 must be designed so that holes 62 do not come too close to aft race 40B so as to weaken inner raceway 30.

Radial holes 64 extend from inner surface 47 through to cage face 68B. Radial holes 64 extend generally straight, or radially, through aft ring 24. However, holes 64 can be angled at any orientations so as to connect holes 62 to cage face 68B. Holes 64 are configured to direct fluid near the center of aft cage rail 20. In other embodiments, holes 64 can be directed anywhere along cage face 68B, but not so as to weaken inner raceway 30.

Lubrication system 60 forms an extension of lubrication system 28 to bring lubricating fluid from collecting annulus 26 back to aft cage rail 20. Rather than delivering lubricating fluid to inner raceway 30 at split line 34, fluid is delivered to cage face 68B to directly lubricate the interface between aft cage rail 20 and aft ring 24. High relative velocities are produced between aft cage rail 20 and aft ring 24. The two surfaces can contact each other, in addition to contacting the ball bearings. Significant heat is thereby produced, requiring application of lubricating fluid. Lubricating fluid can thus be directly provided to this interface, the fluid then draining into inner raceway 30 to lubricate the ball bearings. In yet other embodiments, lubrication system 60 can be used in conjunction with holes 36 of FIG. 4 to provide additional direct lubrication of the ball bearings.

Figure 7:
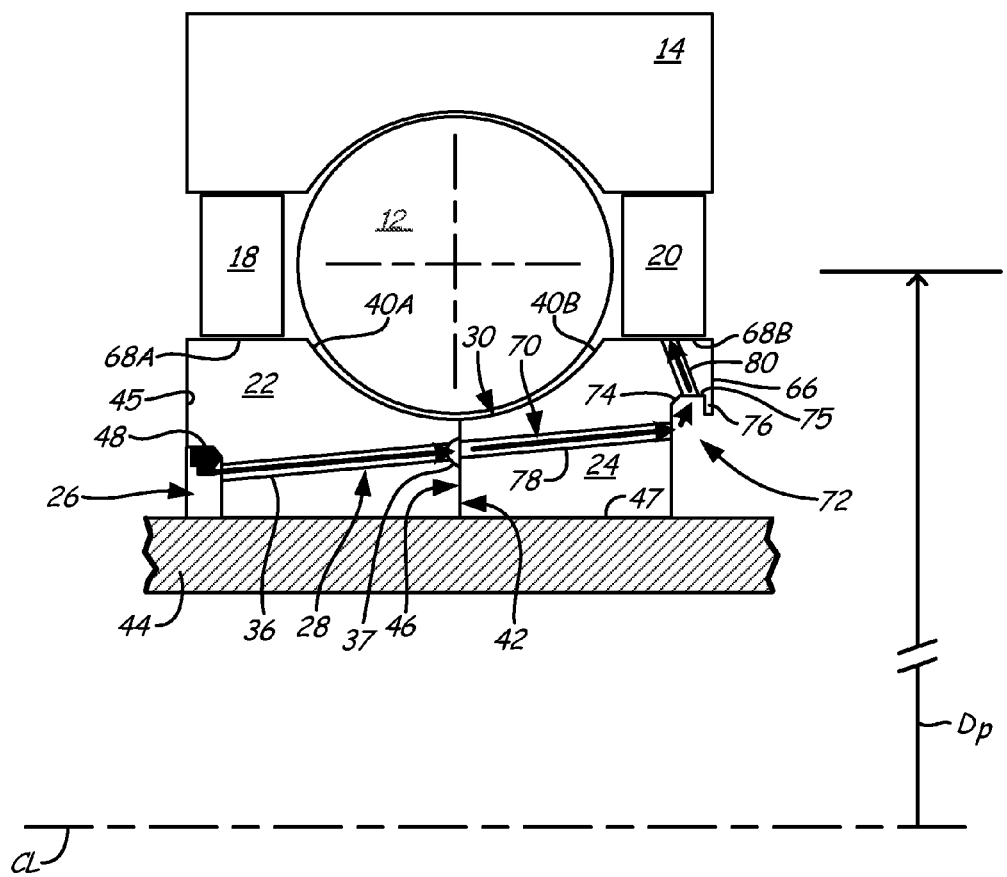
FIG. 7 is a partial side cross-sectional view of an alternative embodiment of the angular contact roller bearing assembly of FIG. 6 having a collecting annulus cage lubrication system.

FIG. 7 is a partial side cross-sectional view of an alternative embodiment of angular contact roller bearing assembly 10 of FIG. 6 in which lubrication system 28 includes collecting annulus cage lubrication system 70. Bearing assembly 10 includes the same elements as shown in FIG. 6, with like reference numerals used throughout. In FIG. 7, however, aft ring 24 does not include holes 62 and 64 and instead rear face 66 of aft ring 24 includes collecting annulus 72, ramp 74, shoulder 75, flange 76, axial hole 78 and radial hole 80, which form collecting annulus cage lubrication system 70.

Collecting annulus cage lubrication system 70 functions in the same way as intersecting-hole lubrication system 60 of FIG. 6. That is to say, system 70 forms an extension of lubricating system 28 to deliver fluid from holes 36 to aft cage rail 20. System 70 is, however, manufactured using a different method. Collecting annulus 72 is machined similarly to collecting annulus 26. For example, annulus 72 includes shoulder 75 against which lubricating fluid pools. Ramp 74, or another ramp connecting shoulder 75 to flange 76, can be included to funnel fluid to holes 80. Flange 76 prevents the fluid from flowing past rear face 66, directing the fluid into hole 80. Hole 78 is machined, or drilled, similarly to hole 62, extending from split face 46 through to annulus 72. Hole 80 is machined, or drilled, similarly to hole 64, extending from shoulder 75 through to cage face 68B. Hole 80 is angled to direct fluid toward the center of aft cage rail 20. Thus, holes 78 and 80 are similar to holes 62 and 64, but annulus 72 eliminates the need for the holes to extend completely through aft ring 24. In other words, holes 62 and 64 are fluidly coupled by the fact that they intersect, while holes 78 and 80 are fluidly coupled by annulus 72. Annulus 72, however, eliminates the need for having to precisely drill holes 78 and 80 such that they intersect.

The present invention permits bearing lubricating and cooling oil to be delivered to ball bearings using conventional systems that deliver the oil to inner split rings. However, rather than needing to space the inner split ring from a shaft, the oil can be delivered to the front side of the inner split ring. This allows the pitch diameter of the bearing assembly to be reduced, thereby allowing the bearing assembly to operate at greater rotational speeds and to handle higher thrust loads. The present invention utilizes a flow annulus positioned along a split face of the forward split ring as a collection point for delivering the fluid directly out to the inner raceway, or for delivering the fluid out to a cage rail adjacent the inner raceway.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A bearing assembly comprising:
   an outer ring having an outer surface and an inner surface, and an outer raceway formed on the inner surface;
   a split inner ring having a first ring and a second ring which mate axially to define an inner raceway formed on an outer surface of the first ring and the second ring, and an inner surface;
   bearing elements disposed between the outer raceway and the inner raceway, and adapted to rotatably move between the split inner ring and the outer ring about a central axis of the bearing assembly;
   a plurality of circumferentially spaced holes, each hole extending from an outside side surface of the first ring to an inside side surface of the first ring, the inside side surface of the first ring mating against an inside side surface of the second ring;
   a first circumferential annulus formed on the inside side surface of the first ring or the inside side surface of the second ring between the inner raceway and the inner surface, the first circumferential annulus fluidly linked to the plurality of circumferentially spaced holes; and
   a lubrication system connecting the first circumferential annulus to the outer surface of the first ring and the second ring.

2. The bearing assembly of claim 1 further comprising:
   a second circumferential annulus fluidly coupled to the outside side surface of the first ring adjacent the inner surface, the second circumferential annulus intersecting the plurality of circumferentially spaced holes.

3. The bearing assembly of claim 2 wherein the second circumferential annulus is formed in the outside side surface of the first ring.

4. The bearing assembly of claim 2 and further comprising:
   a collecting ring adjacent the outside side surface of the first ring, the collecting ring including the second circumferential annulus.

5. The bearing assembly of claim 4 wherein the collecting ring further comprises:
   a plurality of axial slots extending across the ring to intersect the second circumferential annulus at the inner surface.

6. The bearing assembly of claim 2 wherein the second circumferential annulus comprises:
   a shoulder disposed radially outward of the plurality of circumferentially spaced holes.

7. The bearing assembly of claim 1, wherein each of the holes of the plurality of circumferentially spaced holes is angled away from the inner surface as it extends from the outside side surface towards the first circumferential annulus.

8. The bearing assembly of claim 1 wherein the lubrication system comprises:
   a plurality of circumferentially spaced radial slots formed on the inside side surface of the first ring or the inside side surface of the second ring, each radial slot extending from the inner raceway to the first circumferential annulus.

9. The bearing assembly of claim 8, wherein the plurality of circumferentially spaced radial slots is offset circumferentially from the plurality of circumferentially spaced holes.

10. The bearing assembly of claim 8 wherein the first circumferential annulus has a passage diameter larger than a passage diameter of each of the plurality of circumferentially spaced radial slots and larger than a passage diameter of each of the plurality of circumferentially spaced holes.

11. The bearing assembly of claim 8 wherein first circumferential annulus is formed on the inside side surface of the first ring and the plurality of circumferentially spaced radial slots is formed on the inside side surface of the first ring.

12. The bearing assembly of claim 8 wherein first circumferential annulus is formed on the inside side surface of the first ring and the plurality of circumferentially spaced radial slots is formed on the inside side surface of the second ring.

13. The bearing assembly of claim 1 wherein the lubrication system comprises:
   a plurality of circumferentially spaced axial holes extending from the inside side surface of the second ring adjacent the first circumferential annulus; and
   a plurality of circumferentially spaced radial holes fluidly coupled to the plurality of circumferentially spaced axial holes and the outer surface at the second ring.

14. The bearing assembly of claim 13 wherein the fluid coupling between the plurality of circumferentially spaced radial holes and the circumferentially spaced axial holes comprises:
   a second circumferential annulus formed on an outside side surface of the second ring adjacent an inner surface of the second ring, the second circumferential annulus intersecting the plurality of circumferentially spaced axial holes and the plurality of circumferentially spaced radial holes.

15. The bearing assembly of claim 14 wherein the second circumferential annulus comprises:
   a shoulder disposed radially outward of the plurality of circumferentially spaced axial holes, the plurality of circumferentially spaced radial holes extending into the shoulder;
   a ramp angled radially inward from a first end of the shoulder toward the circumferentially spaced axial holes; and
   a flange extending radially inward from a second end of the shoulder.

16. The bearing assembly of claim 13 wherein:
the plurality of circumferentially spaced axial holes extend from the inside side surface of the second ring to an outside side surface of the second ring;
the plurality of circumferentially spaced radial holes extend from the inner surface of the second ring to the outer surface of the first ring and the second ring; and
the plurality of circumferentially spaced radial holes intersect the circumferentially spaced axial holes to form fluid couplings.

17. The bearing assembly of claim 13 and further comprising:
a bearing cage rail positioned between the inner surface of the outer ring and the outer surface of the first ring and the second ring;
wherein the plurality of circumferentially spaced radial holes open toward the bearing cage rail.

18. A split inner ring of a bearing assembly comprising:
a first ring and a second ring which mate axially to define an inner raceway formed on an outer surface of the first ring and the second ring;
a plurality of circumferentially spaced holes, each hole extending from an outside side surface of the first ring to an inside side surface of the first ring, the inside side surface of the first ring mating against an inside side surface of the second ring;
a first circumferential annulus formed on the inside side surface of the first ring or second ring between the inner raceway and an inner surface, the first circumferential annulus intersecting the plurality of circumferentially spaced holes; and
a lubrication system connecting the first circumferential annulus to the outer surface of the first ring and the second ring.

19. The split inner ring of claim 18 and further comprising:
a second circumferential annulus fluidly coupled to the outside side surface of the first ring adjacent the inner surface of the first ring, the second circumferential annulus intersecting the plurality of circumferentially spaced holes.

20. The split inner ring of claim 18 wherein the lubrication system comprises:
a plurality of circumferentially spaced radial slots formed on an inside side surface of the first ring or the second ring, each radial slot extending from the inner raceway to the first circumferential annulus.

21. The split inner ring of claim 18 wherein the lubrication system comprises:
a plurality of circumferentially spaced axial holes extending from the inside side surface of the second ring adjacent the first circumferential annulus; and
a plurality of circumferentially spaced radial holes fluidly coupled to the plurality of circumferentially spaced axial holes and the outer surface at the second ring.

22. The split inner ring of claim 21 wherein the fluid coupling between the plurality of circumferentially spaced radial holes and the circumferentially spaced axial holes comprises:
a second circumferential annulus formed on an outside side surface of the second ring adjacent an inner surface of the second ring, the second circumferential annulus intersecting the plurality of circumferentially spaced axial holes and the plurality of circumferentially spaced radial holes.

23. The split inner ring of claim 21 wherein:
the plurality of circumferentially spaced axial holes extend from the inside side surface of the second ring to an outside side surface of the second ring;
the plurality of circumferentially spaced radial holes extend from the inner surface of the second ring to the outer surface of the first ring and the second ring; and
the plurality of circumferentially spaced radial holes intersect the circumferentially spaced axial holes to form fluid couplings.

\* \* \* \* \*